United States Patent [19]

Binder et al.

[11] Patent Number: 5,268,925
[45] Date of Patent: Dec. 7, 1993

[54] METHOD AND APPARATUS FOR THE SEMI-CONTINUOUS MELTING AND DISCHARGING OF CERAMIC MATERIAL IN AN INDUCTION MELTING FURNACE WITH SINGERING CRUST CRUCIBLE

[75] Inventors: Dieter Binder, Alzenau; Peter Kleinschmit, Hanau; Gerhard Birtigh, Nidderau; Klaus Zetzmann, Kleinostheim, all of Fed. Rep. of Germany

[73] Assignee: Degussa Aktiengesellschaft, Frankfurt am Main, Fed. Rep. of Germany

[21] Appl. No.: 842,606

[22] Filed: Feb. 27, 1992

[30] Foreign Application Priority Data

Mar. 1, 1991 [DE] Fed. Rep. of Germany ....... 4106537

[51] Int. Cl.⁵ .............................................. F27D 3/00
[52] U.S. Cl. ..................................... 373/142; 373/141; 373/143; 373/155; 373/156; 266/276; 266/226; 65/207; 65/212; 432/247
[58] Field of Search ............... 373/142, 143, 138, 115, 373/33, 35, 151–156; 75/12, 61, 46; 65/207, 212, 215, 260, 264–265, 267, 324, 327, 333, 337, 345; 266/229, 236, 240, 276, 274; 414/184, 182; 432/247

[56] References Cited

U.S. PATENT DOCUMENTS

| | | |
|---|---|---|
| 1,338,881 | 5/1920 | Stock . |
| 2,785,214 | 3/1957 | Segsworth ......................... 373/153 |
| 3,790,338 | 2/1974 | Duca ................................. 432/247 |
| 3,870,510 | 3/1975 | Martin et al. ....................... 75/61 |
| 4,226,407 | 10/1980 | Reinbold ............................. 266/226 |
| 4,610,017 | 9/1986 | Perrier de la Bathie et al. ... 373/156 |
| 4,658,404 | 4/1987 | Sick et al. ........................... 373/143 |
| 4,687,502 | 8/1987 | Douglas et al. ..................... 65/164 |
| 4,735,647 | 4/1988 | Rose et al. ......................... 65/207 |
| 4,989,842 | 2/1991 | Doriath et al. ..................... 266/276 |

FOREIGN PATENT DOCUMENTS

| | | |
|---|---|---|
| 0079266 | 5/1983 | European Pat. Off. . |
| 0119877 | 9/1984 | European Pat. Off. . |
| 0248727 | 12/1987 | European Pat. Off. . |
| 1430192 | 1/1966 | France . |

OTHER PUBLICATIONS

U. J. Alexander, "Current Topics in Materials Science" vol. 1, (1978), pp. 421–480.

Primary Examiner—Bruce A. Reynolds
Assistant Examiner—Tu Hoang
Attorney, Agent, or Firm—Beveridge, DeGrandi, Weilacher & Young

[57] ABSTRACT

A method is disclosed for the semi-continuous melting of ceramic material by means of inductive melting in high-frequency and medium-frequency induction melting furnaces whose melting coil surrounds a sintering crust crucible and contains a run-out channel. In the method, melt is periodically run out and material to be melted is supplied to the crucible so as to replace the material removed preferably so as to maintain a constant level. An intensively cooled channel is used as a run-out device. For the melt broaching, the melt nose is grasped from below by way of an automatically controllable broaching lance of a broaching device and raised. The broaching lance is then advanced between the bottom of the channel and the solidified melt until the sintering crust is pierced. The method permits a reliable and economic management of the process and the maintenance of the quality of the melted products. A device for periodic melt broaching as well as an induction melting furnace equipped with an intensively coolable run-out channel provides apparatus for carrying out the above method.

16 Claims, 3 Drawing Sheets

METHOD AND APPARATUS FOR THE SEMI-CONTINUOUS MELTING AND DISCHARGING OF CERAMIC MATERIAL IN AN INDUCTION MELTING FURNACE WITH SINGERING CRUST CRUCIBLE

FIELD OF THE INVENTION

The invention is relative to a method of semi-continuous melting and discharging of ceramic materials in high-frequency and medium-frequency induction melting furnaces with sintering crust crucible wherein melt is removed by means of a periodic melt broaching. Further subject matter is relative to a furnace suitable for use in the present method and to a device for carrying out the periodic melt broaching. This device comprises a tool with a movable broaching lance for removing solidified melt in the run-out channel of the furnace and the piercing of the sintered crust.

BACKGROUND DISCUSSION

Induction melting furnaces are known in various designs and the frequencies which can be used extend from approximately 50 Hz into the MHz range. The design of the furnace and crucible for receiving the melt as well as the devices for removing the melt depend to a considerable extent on the thermal and electric properties of the melt material. In order to melt ceramic materials with melting points above 1000° C., especially between 2000° C. and 3000° C. and to avoid impurities of the melt by the crucible material, the so-called skull or sintering crust technology has proven to be suitable, in which the material to be melted forms a sintering crust crucible on the cold wall of a crucible form—cf. W. Assmus, "Chemie Ingenieur Technik" 55, (1983) (9), pp. 716–707 and V. J. Alexanderov, "Current Topics in Materials Science" Vol. 1, (1978), pp. 421–280.

The technology described in the cited documents and the crucibles used therein do not permit a semi-continuous production of a high-melting material with external further processing of the melt. Moreover, this technology exhibits further disadvantages as it is time-consuming and work-intensive on account of the particular refilling of the crucible, formation of the sintering crust and cooling off. In addition, fluctuations in quality from batch to batch can not be excluded.

The high-frequency induction melting furnace of French Patent No. 1,430,192 permits the attainment of temperatures of up to 3000° C. and has a sintering crust crucible. The crucible according to FIG. 2 of the French patent comprises a spout for teeming the melt. The entire contents of the crucible can be emptied herewith by tilting in as far as a sintering crust optionally formed on the surface of the crucible is pierced through. No suggestion can be gathered from this document for a semi-continuous operation by removing a part of the melt at periodic intervals and supplementing the removed amount of melt by periodically or continuously adding material to be melted or for a suitable device to this end. A total emptying of the crucible is disadvantageous because the total refilling of the crucible with the dielectric, powdery material to be melted as well as with the metal required for the initial energy absorption which is then necessary is expensive and entails a low space-time yield. In addition, the further processing of the total molten crucible contents results in problems on account of the amount of energy expended if the crucible contents are large. Finally, rather large variations in the quality of the individual crucible charges are difficult to avoid.

EP-A 0,079,266 teaches a further induction melting furnace with a sintering crust crucible. This furnace with several windings is operated with a frequency of preferably 10 kHz to 50 kHz and comprises a device for removing the melt at the bottom of the furnace. This device comprises a discharge tube which extends through the bottom and is surrounded by an inductor which is independent of the actual furnace. The discharge tube consists of a material which absorbs the selected frequency and can be closed with a plug of the same material. This discharge device, which must not enter into any conductive connection with the bottom of the crucible, must be cooled during the actual melting process by a suitable cooling device. The technical design of such a device is therefore very expensive. Moreover, the introduction of impurities into the molten material due to contact with the material of the discharge tube can not be sufficiently excluded, especially if, for example, the melt is to be discharged periodically or even continously. The furnace of EP-A 0,079,266 is suitable for melting those ceramic materials whose so-called coupling temperature and melting temperature are very close to one another. In contrast thereto, short circuits and associated damage to the inductor and the generator can occur in the case of materials with a coupling temperature and a melting temperature which are far apart from one another. The furnace in EP-A 0,079,266 can thus be used only in a limited fashion, e.g. for melting glass and enamel but not very high-melting materials such as e.g. titanium dioxide or zirconium silicate.

EP-B 0,119,877 teaches a high-frequency induction melting furnace whose wall simultaneously forms the inductor and the cold wall side of a sintering crust crucible. The inductor includes a single flat winding with several conduits. According to one embodiment, the furnace comprises an optionally cooled tube passing laterally through the coil which tube is intended to remove the melt. In the case of materials with a high melting point and especially in the case of materials such as zircon sand, in which a volumetric increase occurs during cooling off, e.g. by means of modification transformation, such a tube becomes clogged; however, a heating of the tube can not be effected and/or results in considerable technical expense and/or material problems.

An attempt by the Applicant of the present invention at simultaneously supplying material to be melted and removal of the melt in a furnace of the above-mentioned type (EP-B 0,119,877) proved to be impracticable in the case of high-melting materials such as zircon sand because either the level drops too rapidly and non-molten material is entrained by the melt or, in the case of too slight a flow-off, the melt solidifies in the run-out tube. An opening of the run-out tube proved to be extremely problematic. The high resistance of the solidified melt in the run-out tube aggravated or prevented an opening by means of knocking with chisel and hammer. Even drilling out the solidified material presented difficulties on account of the hardness and brittleness of the materials examined. In the case of only a partial opening of the tube, it closed up rapidly again due to crust formation. In addition, manual labor in the area of a high- to medium-frequency scattered radiation is not admissible and is dangerous even after the oscillating circuit has been shut off on account of the hot melt.

EP-A 0,248,727 describes a generic induction melting furnace which comprises only a single flat winding with one conduit as the inductor. Customary tube generators are used for the high-frequency range and semiconductor generators are used for the medium-frequency range. According to one embodiment of the furnace in EP-A 0,248,727, the furnace is provided from below with a bottom outlet tube with a plug. This device permits only a total emptying of the crucible contents with the disadvantages already mentioned.

A total or optionally partial emptying of an induction melting furnace by means of tilting the furnace by means of a tilting device and teeming the melt via a teeming lip is known from U.S. Pat. No. 2,785,214. However, the teeming is only possible in as far as no thermal radiation crust from the material to be melted has formed over the melt. However, such a crust is desirable from an energy saving standpoint.

SUMMARY OF THE INVENTION

The present invention is thus directed at providing a method which makes possible a semi-continuous melting and discharging operation in accordance with sintering crust technology in induction melting furnaces with a sintering crust crucible. The method is directed at permitting a periodic removal of a defined amount of melt from the crucible while avoiding the disadvantages of the previously known methods. The present invention makes use of an induction melting furnace suitable for periodic melt broaching as well as a device for the periodic melt broaching of the same which can be automatically controlled.

A method was found for the semi-continuous melting of ceramic material by means of inductively melting it in the high-and medium-frequency range in induction melting furnaces which each include a melting inductor coil structure defining a wall that surrounds a sintering crust crucible, discharging the melt through a run-out device extending from the melting inductor coil structure and charging the furnace with an amount of the material to be melted which corresponds to the amount of melt discharged (e.g., supplying material which, when melted, represents the same amount of melted material discharged).

The method of the present invention is further characterized in that an open and intensively cooled run-out channel is located at the upper edge of the melting inductor and is used as the run-out device. The run-out of the melt is opened in periodic intervals by means of broaching the melt with a broaching device. The broaching device comprises a broaching lance and means for automatically regulating the position of the broaching lance. The automatic regulating device varies the angle of inclination of the broaching device for a parallel shifting of the broaching lance, which is positioned horizontally or at an incline. The lance is preferably positioned so as to extend essentially parallel to the bottom of the run-out channel. The automatic regulating device drives the lance such that the broaching lance is first guided under the melt nose of the remainder of solidified melt remaining in the run-out channel from the preceding melt broaching, is then raised with this nose and then subsequently driven forward between the raised, solidified melt and the bottom of the channel until it pierces through the sintering crust. The method is also characterized in that the amount of run-out is regulated as required by tilting the furnace by means of a tilting device.

The method of the present invention and the related apparatus including the furnace, coolable run-out channel, and the device for periodic melt broaching are suitable for melting ceramic materials which form a sintering crust crucible under the aforementioned operating conditions. Operating temperatures for operating conditions like those described above are, in general, above 1000° C., especially in a range of 1500° to 3000° C. The concept "melt" includes chemical reactions in the melted state.

The term "semi-continuous" means that approximately 1 to 70% of the melt, especially 5 to 30% of the crucible contents, is let out of the crucible at a time in periodic intervals and after each discharge the corresponding amount of the material to be melted is resupplied and melted. The amount of melt flowing out per broaching is a function of the geometry and the degree of charging of the crucible, of the form and position of the run-out channel and of the angle of inclination of the crucible. The angle of inclination of the crucible and surrounding melting inductor structure can be freely selected via a tilting device between 0° and 90° and the inductor structure is usually tilted during the periodic broaching only in a range between 0° and 30°.

BRIEF DESCRIPTION OF THE DRAWINGS

The method of semi-continuously melting and discharging the melt, the induction furnace with attached run-out used in carrying out this method, and the device for periodic melt broaching are explained using the following drawings.

DETAILED DESCRIPTION OF THE PREFERRED EMBODIMENTS

The principle design of an induction melting system comprises a preferably self-controlled oscillating circuit of an aperiodic generator. The oscillating circuit is formed by the melting coil of the induction furnace and by capacitors. The necessary frequency is generated in the high-frequency range (greater than 10 kHz to 500 kHz) by tube generators and in the medium-frequency range (around and less than 10 kHz to approximately 500 Hz) by semiconductor generators.

Figure 1:
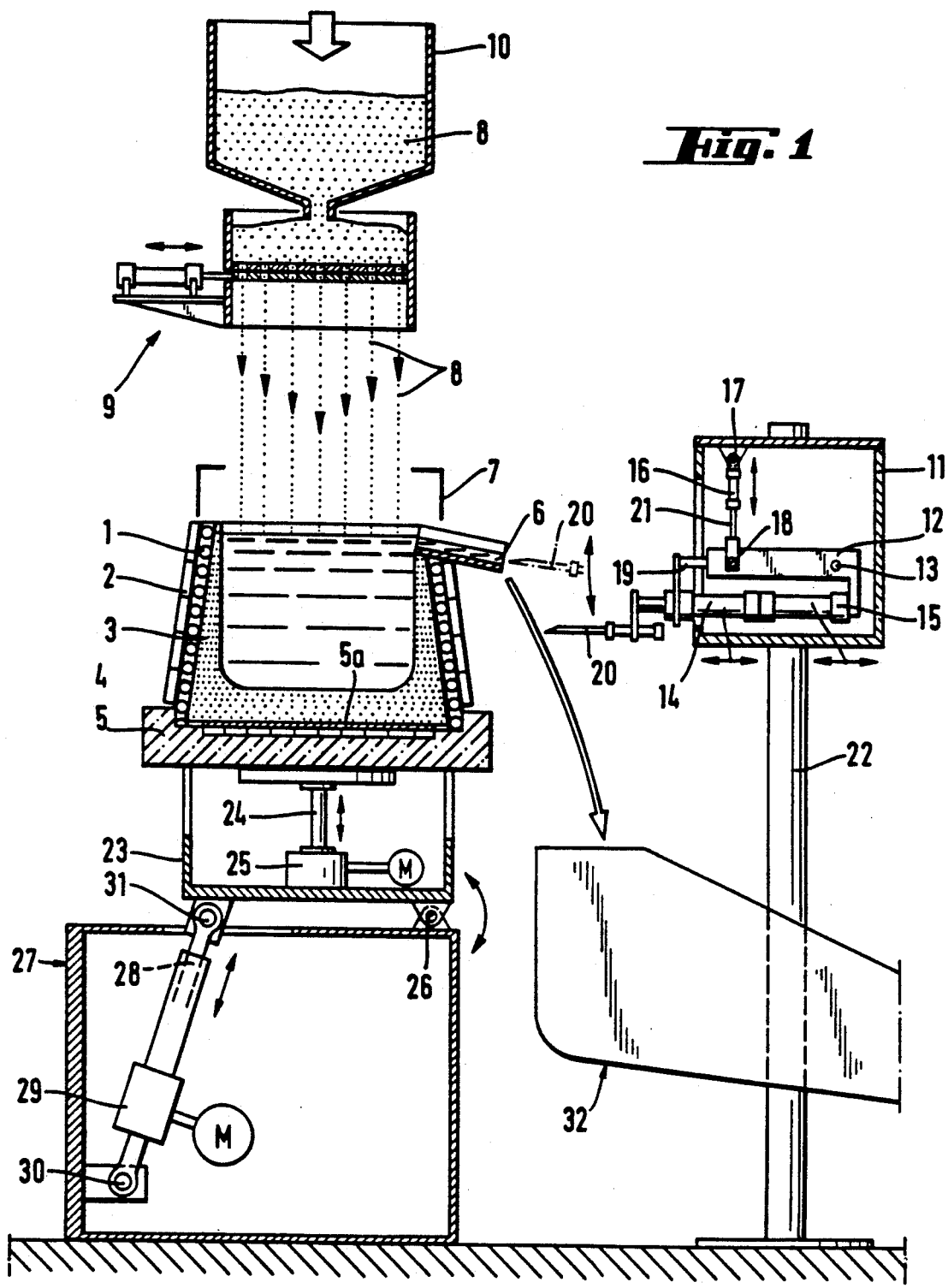
FIG. 1 shows a section through the induction melting furnace in accordance with the invention with sintering crust crucible and run-out channel along with the device of the invention for periodic melt broaching, as well as devices for dosing the material to be melted, for cooling off the melt outside of the furnace and devices for raising and lowering and tilting the furnace. The capacitors of the oscillating circuit as well as the generator and the electric devices for energy supply and control of the process are those commonly used in the industry and are not shown in FIG. 1.

FIG. 1 shows a preferred embodiment of an induction melting furnace. Reference number 1 signifies a main melting coil structure which is surrounded by cooling device 2 (e.g. half tubes welded onto the coil or a double walled jacket, as is indicated in FIG. 1) which surrounds sintering crust crucible 3. Sintering crust crucible 3 is comprised of the material to be melted, and receives melt 4 therein. The melting coil rests on cast form 5, which also receives cooled coil bottom 5a isolated from the main melting coil structure. Open run-out channel 6 is fixed in the area of the upper edge of the main coil structure by means of holding device 6/4 shown in FIG. 2 and bores 6/5 for fastening elements (not shown). Channel 6 is fixed in position such that the channel bottom is located before the broaching of the melt, below the level of the melt and such that the upper edge of the channel essentially corresponds with the edge of the main melting coil structure. The cross section of the channel as well as its inclination influence the amount of melt runoff. A slight inclination of the channel and a small difference in height between the channel bottom on the furnace-side end and the level of the melt in the crucible can result, on account of the slow flow, in a rapid solidification of the melt in the channel and in the formation of a new sintering crust on the furnace-side end of the channel.

The melting coil structure can have one or several windings although single-winding coils of copper or aluminum are preferred. In order to facilitate the removal of the melt regulus after the end of the melting with periodic melt broachings and cooling-off, it is advantageous to employ a coil body with a slightly conical form (according to FIG. 1) if the melt material expands when cooling off, e.g. due to modification transformations.

The melt crucible is charged from storage container 10, from which the material to be melted is supplied to a device 9 for the gravitational dosing of material 8 over essentially the entire surface area of the crucible opening in an essentially equally dispersed manner. In order to minimize heat losses, thermal protection shields 7 can be arranged around the upper edge of the furnace. In addition, it is advantageous to keep the crucible surface covered with the material to be melted.

The solidified regulus can be readily removed from the coil by means of a device 23 for raising and lowering the coil bottom 5a. As shown in FIG. 1, device 23 comprises lift cylinder 24 and drive unit 25. The main coil structure and crucible contained therein are tilted by means of tilting device 27, which can be designed in various forms. In FIG. 1, reference number 28 designates a lift rod, 29 a drive unit, 30 and 31 represents points of attachment between the lifting device and 26 represents the point of rotation of the furnace. The amount of melt outflow can be regulated by regulating the tilting of the furnace.

Device 32 serves to cool off the melt running out periodically via channel 6.

The device in accordance with the invention for periodic melt broaching comprises at least one lifting device (16, 21) for varying the inclination or for the vertical parallel shifting of the advancing linkage rods (19) carrying or supporting broaching lance (20). The device comprises at least one adjusting device (14, 15) for advancing the advancing linkage with attached broaching lance. Also, the lifting device and adjusting means can be regulated in a programmable manner using programmable regulating means.

In the preferred embodiment of the melt-broaching device shown in FIG. 1, the lifting device is designed as a cylinder assembly comprised of pneumatic cylinder 16 with lifting rod 21. Cylinder 16 has one end fixed in a pivotable manner to fastening point 17 of holder 11. Lifting rod 21 is attached at its free end to shackle 12 at pivot point 18. Shackle 12 receives advancing linkage 19 and is rotatably fastened to holder 11 at fastening point 13. The angle of inclination of broaching lance 20 can be varied in a vertical direction by activating lift cylinder 16 and can be adapted therewith to the angle of inclination of run-out channel 6. The adjusting device for advancing or retracting linkage 19 and attached broaching lance 20 is formed by two pneumatic cylinders 14, 15 which are fastened to holding shackle 12 and adapted to move linkage 19 in a telescopic fashion. Instead of pneumatic cylinders, other means with the same function, that is, raising/lowering and advancing-/withdrawing, such as e.g. spindles can also be used. An alternative lifting device suitable for use in the present invention includes a drive device in contact with holder 11, which in this instance contains the broaching lance and devices for advancing, that is adapted to raise and lower or rotate holder 11 with respect to support 22. According to a preferred embodiment, broaching lance 20 is designed as a drill bit which executes a fixed-cycle forward movement upon a predetermined amount of resistance, similar to a hammer drill, with or without rotary motion.

Figure 2:
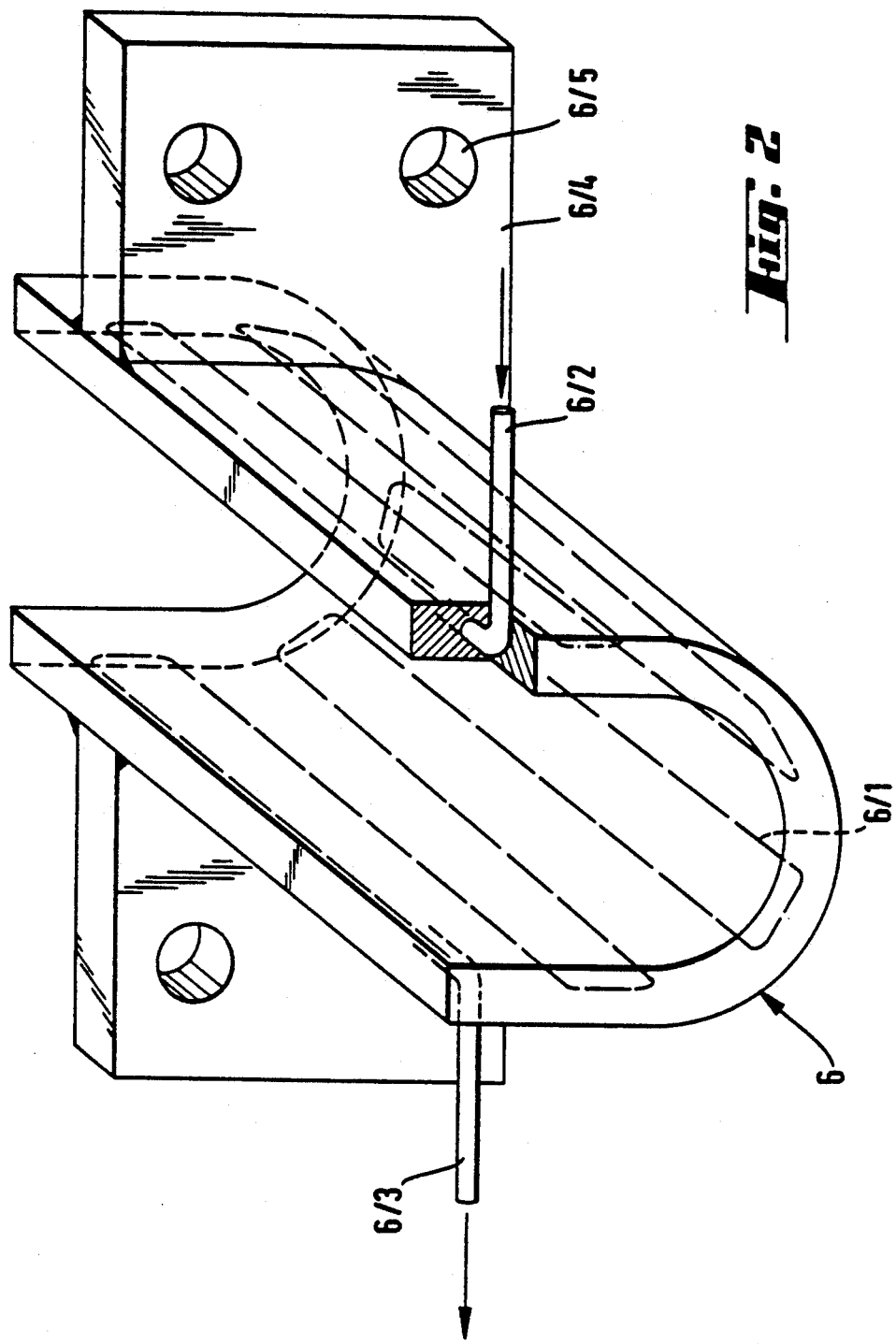
FIG. 2 shows the open, coolable run-out channel.

FIG. 2 shows a preferred embodiment of the coolable channel, which is open on top. The channel jacket contains a maximum number of bores 6/1 extending parallel to the longitudinal direction of the channel (shown in dotted lines in FIG. 2) which are connected to each other in a meandering fashion and through which a cooling medium flows which is supplied through line 6/2 and removed through line 6/3. Holder 6/4 is fixed to the melting coil structure by means of fastening elements (not shown) extending through holes 6/5 and the coil structure. Holder 6/4 provides a way to position the channel. As intensive a cooling of the channel as possible is preferred because under this condition no cakings occur in the melting operation aside from a readily removable melt nose.

Figure 3:
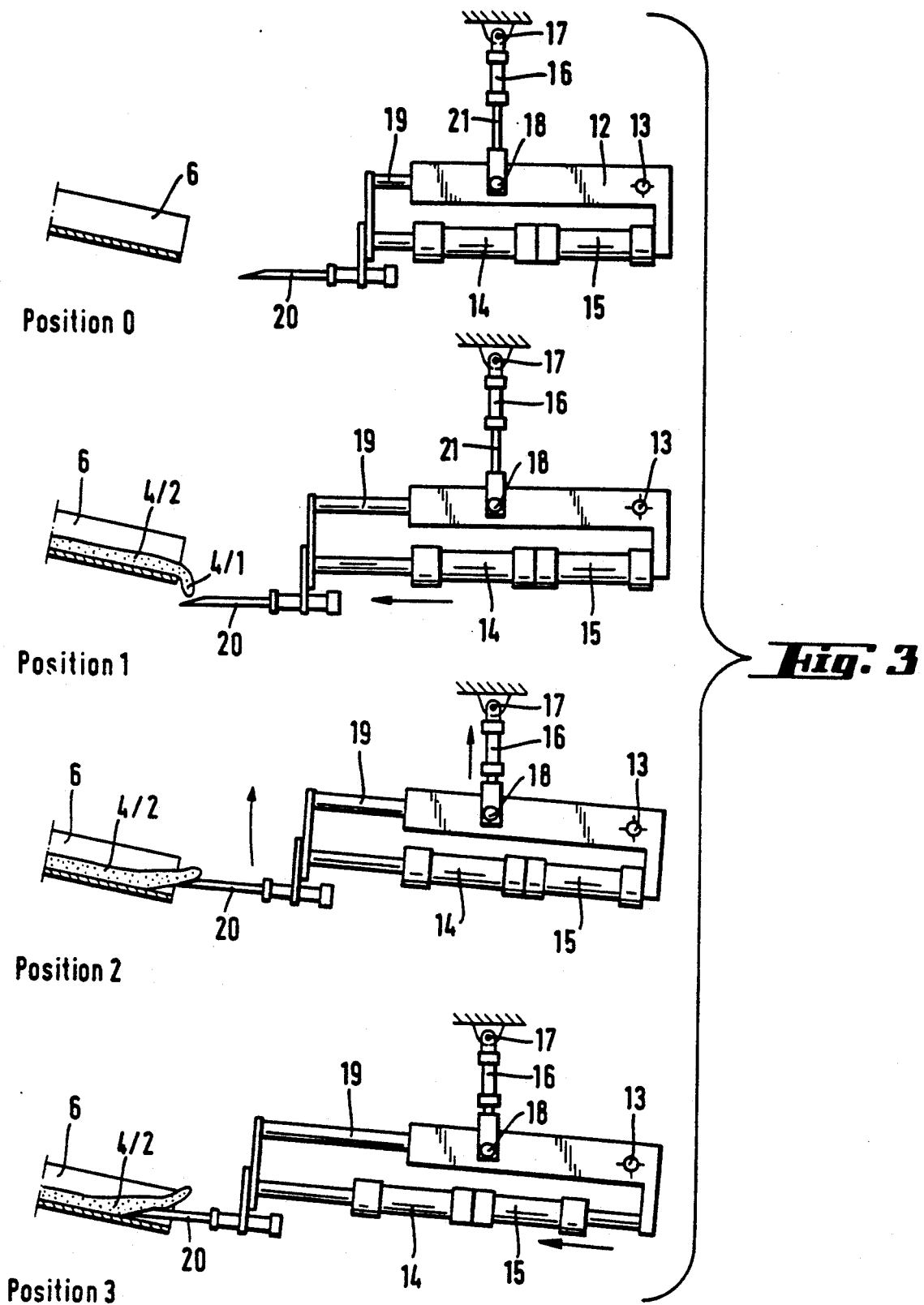
FIG. 3 includes the initial position as well as three operating positions of a device for the periodic melt broaching with respect to the run-out channel.

FIG. 3 shows the initial position and three operating positions of the broaching tool together with the open-ended channel, which also contains solidified melt 4/2 in positions 1 to 3. The broaching lance is first brought under melt projection or nose 4/1 by means of a program-controlled actuation of cylinder 14 and therewith by the advance of linkage 19. In a second stage, lifting cylinder 16 is actuated, as a result of which the broaching lance is upwardly inclined and the melt nose raised thereby (position 2). Finally, cylinder 15 is actuated and the lance is advanced under the solidified melt on the bottom of the channel (position 3), as a result of which the solidified melt is completely raised and the sintering crust is easily pierced on the furnace-side end of the channel.

In the case of an especially thick sintering crust, it can be advantageous to broach the sintering crust with a second broaching lance in the area of the transition from the melting coil wall to the channel in addition to the broaching with the device of the invention.

While the melt is running off, the crucible can be loaded further with raw material if a subsequent separation of the molten and non-molten material entrained during the runoff does not pose any problems.

It could not have been predicted that the guiding in accordance with the invention of the broaching lance by means of the device conceived to this end permits a melt broaching which is free of problems and which can be executed with a low expenditure of energy. Furthermore, it was surprising that as the intensity of the cooling of the run-out channel increases, the melt solidified in the channel can be more readily removed and, in addition, the amount of solidified material decreases. The following result as significant advantages of the method of the invention and of the devices for carrying out this method:

Problem-free melt broaching, which makes a trouble free, semi-continuous operation possible.

Reliable management of the melting technology even on a manufacturing scale.

The ability to use medium-frequency induction melting furnaces with single-winding melting coils with a rather large diameter and correspondingly large crucible contents.

Uniform quality of the melted products by means of a semi-continuous operation instead of the batch operation, which was considered in the past to be hardly avoidable in the case of very high-melting materials.

An increase of the space-time yield because repetitive, time-consuming measures for refilling the crucible, cooling off and removing the melt regulus are necessary only at rather great time intervals.

An increase in the work safety of the personnel working with the melting system on account of the possibility of using the automatically controlled broaching device.

EXAMPLES

Zircon sand was melted at approximately 2700° C. in an induction melting system according to FIG. 1 and using melting coils of differing geometry to each of which a run-out channel in accordance with FIG. 2 was fixed to the upper melting coil structure edge and the illustrated melt broaching device for periodic melt broaching was used. The periodic melt broaching took place in accordance with FIG. 3. The melt was quenched in a quenching channel with compressed-air nozzles and water nozzles, which resulted in the obtention of a zirconium dioxide-silica mixture in the form of granules. The nozzles were positioned in serial fashion along the inside vertical edge of container 32.

The melting crucible was filled to approximately 90% with zircon sand at the start of the test. In order to absorb the high-frequency field below the coupling temperature of the zircon sand and to heat the zircon sand by thermal contact, horizontal molybdenum platelets were embedded in the zircon sand. After the crucible contents had been thoroughly molten except for a sintering crust, zircon sand was added in and the semi-continuous operation begun. The test parameters and results follow from the table.

| Example | 1 | 2 | 3 | 4 | 5 | 6 |
| --- | --- | --- | --- | --- | --- | --- |
| Melting coil: | | | | | | |
| Diameter (cm) | 25 | 40 | 40 | 40 | 60 | 90 |
| Height (cm) | 25 | 25 | 25 | 25 | 30 | 45 |
| Number of windings | 2 | 2 | 1 | 1 | 1 | 1 |
| Operating frequency (kHz) | 150 | 120 | 250 | 250 | 30 | 10 |
| (Examples 1 to 5 tube generator) | | | | | | |
| (Example 6 semiconductor generator) | | | | | | |
| Run-out channel: | | | | | | |
| width (mm) | 16 | 16 | 16 | 16 | 16 | 22 |
| Cooling water (l/h) | 400 | 400 | 400 | 400 | 400 | 700 |
| Throughput (kg ZrSiO$_4$/h) | 16 | 20 | 29 | 33 | 52 | 180 |
| Number of broachings per hour | 4–6 | 4–5 | 2–3 | 1 | 3 | 3 |
| Operating time (h) | 40 | 40 | 100 | 20 | 8 | 8 |

The melt broachings took place without problems because the melt of the preceding broaching, which had solidified in the channel, was able to be raised together with the melt nose by means of the broaching device, which freed the way for the piercing of the sintering crust. A significant reduction of the volumetric flow of cooling water through the cooling device of the channel resulted immediately in crusts which were difficult to remove, as a result of which the operation of the system was considerably disturbed.

Further variations and modifications will be apparent to those skilled in the art and are intended to be encompassed by the claims appended hereto.

German Priority Application No. P 41 06 537.9 is relied on and incorporated by reference.

What is claimed is:

1. A method for the semi-continuous melting and discharge of melted ceramic material in an induction melting furnace having a melting coil inductor structure surrounding a sintering crust crucible, comprising the steps of:
   inductively melting ceramic material in said furnace to create melted ceramic material;
   discharging melted ceramic material through a run-out channel located at an upper edge of the melting coil inductor structure;
   cooling the run-out channel by means of a cooling fluid;
   periodically broaching solidified melted ceramic material with a broaching device comprising a broaching lance; and
   adjusting said broaching lance such that the lance is first guided under a solidified nose projecting from solidified melted ceramic material extending in the run-out channel from a previous discharge of melted ceramic material through said channel, then raised to lift the nose and then subsequently driven forward between the raised, solidified nose and the channel until said lance pierces through a sintering crust formed upstream from the nose.

2. A method as recited in claim 1 further comprising the step of charging said furnace with an amount of ceramic material which corresponds to an amount of melted ceramic material discharged from said furnace.

3. A method as recited in claim 1 wherein the step of discharging the melted ceramic material includes the step of regulating an amount of discharged melted ceramic material by tilting said furnace by means of a tilting device.

4. A method as recited in claim 1 wherein said step of melting ceramic material includes heating said ceramic material with a tube generator having an operating frequency between 30–300 kHz.

5. A method as recited in claim 1 wherein said step of melting ceramic material includes heating said ceramic material with a semi-conductor generator having a frequency between 500 Hz to 10 kHz.

6. A method as recited in claim 3 wherein said run-out channel slopes downwardly away from the upper edge of said melting coil inductor and adjusting said broaching lance includes adjusting said lance to extend between said portion of solidified ceramic material and a bottom of the channel while said means for inductively melting the ceramic material and downwardly sloped run-out channel are tilted by said tilting device.

7. A method as recited in claim 1 wherein broaching the solidified melt includes rotating a drill bit forming part of said broaching lance.

8. Apparatus for the semi-continuous melting and discharge of ceramic material in an induction melting furnace assembly having a melting coil inductor structure surrounding a sintering crust crucible, comprising:

means for inductively melting the ceramic material to create melted ceramic material;

a run-out channel located at an upper edge of the melting coil inductor structure;

means for cooling the run-out channel;

a broaching lance;

means for supporting and adjusting said lance, said means for supporting and adjusting including means for guiding said lance under a nose of solidified melted ceramic material projecting from a portion of said solidified melted ceramic material extending in said channel from a previous melted ceramic material discharge, means for raising said lance so as to raise the nose and said portion of solidified ceramic mateiral, and means for shifting the lance so as to drive the lance forward between the raised portion of solidified ceramic material and said channel so that said lance pierces through a sintering crust formed upstream of the nose.

9. An apparatus as recited in claim 8 further comprising means for charging said furnace with an amount of melted ceramic material which corresponds with an amount of ceramic discharged through said channel.

10. An apparatus as recited in claim 8 further comprising means for lifting said sintering crust crucible.

11. An apparatus as recited in claim 8 further comprising means for tilting said means for inductively melting the ceramic material so as to discharge melted ceramic material out through said channel.

12. An apparatus as recited in claim 8 wherein said means for inductively melting includes a tube generator having an operating frequency between 10–500 kHz.

13. An apparatus as recited in claim 8 wherein said means for inductively melting includes a semi-conductor generator having a frequency between 500 Hz to 10 kHz.

14. An apparatus as recited in claim 8 further comprising adjusting means having a program-controlled actuation device for controlled adjustment of said lance.

15. An apparatus as recited in claim 8 wherein said run-out channel slopes downwardly away from the upper edge of the melting coil inductor structure.

16. An apparatus as recited in claim 8 wherein said lance includes a drill bit.

* * * * *